US010585889B2

(12) United States Patent
Kavulya et al.

(10) Patent No.: US 10,585,889 B2
(45) Date of Patent: Mar. 10, 2020

(54) OPTIMIZING SKEWED JOINS IN BIG DATA

(71) Applicant: INTEL CORPORATION, Santa Clara, CA (US)

(72) Inventors: Soila P. Kavulya, Beaverton, OR (US); Michael R. Alton, Portland, OR (US); Abolfazl Shahbazi, West Linn, OR (US); Todd Lisonbee, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 14/757,748

(22) Filed: Dec. 23, 2015

(65) Prior Publication Data
US 2017/0185648 A1 Jun. 29, 2017

(51) Int. Cl.
*G06F 16/2453* (2019.01)
*G06F 16/2455* (2019.01)

(52) U.S. Cl.
CPC .. *G06F 16/24545* (2019.01); *G06F 16/24544* (2019.01); *G06F 16/24554* (2019.01)

(58) Field of Classification Search
CPC ......... G06F 17/30469; G06F 17/30466; G06F 17/30486; G06F 17/30498; G06F 17/30463; G06F 17/30536; G06F 17/5072; G06F 17/30445; G06F 16/24545; G06F 16/24544; G06F 16/24554; G06Q 10/06; G06Q 40/06
USPC ...................................................... 707/720
See application file for complete search history.

(56) References Cited

U.S. PATENT DOCUMENTS

| | | | | |
|---|---|---|---|---|
| 5,832,182 | A * | 11/1998 | Zhang | G06F 17/3025 706/50 |
| 5,987,468 | A * | 11/1999 | Singh | G06F 17/30327 |
| 6,732,107 | B1 * | 5/2004 | Luo | G06F 17/30241 |
| 8,356,050 | B1 * | 1/2013 | Olston | G06F 17/30896 707/769 |
| 9,367,556 | B2 * | 6/2016 | Attaluri | G06F 17/3033 |
| 2005/0131914 | A1 * | 6/2005 | Abdo | G06F 17/30536 |
| 2008/0263001 | A1 | 10/2008 | Lohman et al. | |
| 2009/0248617 | A1 * | 10/2009 | Molini | G06F 16/24544 |
| 2009/0292668 | A1 * | 11/2009 | Xu | G06F 17/30498 |
| 2010/0088298 | A1 * | 4/2010 | Xu | G06F 17/30498 707/705 |

(Continued)

OTHER PUBLICATIONS

Spyros Blanas, Jignesh M. Patel, Vuk Ercegovac, Jun Rao, Eugene J. Shekita, Yuanyuan Tian, A Comparison of Join Algorithms for Log Processing in MapReduce, Jun. 6-11, 2010, pp. 975-986.*

(Continued)

*Primary Examiner* — Jay A Morrison
*Assistant Examiner* — Antonio J Caiado
(74) *Attorney, Agent, or Firm* — International IP Law Group, P.L.L.C.

(57) ABSTRACT

An apparatus for optimizing a skewed join is described herein. The apparatus includes logic, at least partially including hardware logic, to determine that a dataset for the skewed join comprises a skewed key that does not fit in memory. The apparatus also includes logic to model the skewed join as a queue. The apparatus also includes logic to estimate a cost of the skewed join based on the modeled queue. The apparatus evaluates different join techniques, and partitioning strategies for the skewed join, and chooses the plan with the lowest cost.

18 Claims, 5 Drawing Sheets

(56) References Cited

U.S. PATENT DOCUMENTS

| | | | |
|---|---|---|---|
| 2010/0114870 A1* | 5/2010 | Al-Omari | G06F 16/24524 707/718 |
| 2010/0145929 A1 | 6/2010 | Burger et al. | |
| 2012/0310916 A1* | 12/2012 | Abadi | G06F 17/30445 707/713 |
| 2012/0311581 A1* | 12/2012 | Balmin | G06F 9/5066 718/100 |
| 2013/0346988 A1 | 12/2013 | Bruno et al. | |
| 2014/0156635 A1* | 6/2014 | Grochowski | G06F 16/2453 707/714 |
| 2014/0280022 A1* | 9/2014 | Jagtap | G06F 16/2456 707/714 |
| 2014/0310258 A1* | 10/2014 | Tian | G06F 17/30445 707/718 |
| 2014/0310259 A1* | 10/2014 | Tian | G06F 17/30545 707/718 |
| 2015/0186465 A1 | 7/2015 | Gaza et al. | |
| 2016/0026667 A1* | 1/2016 | Mukherjee | G06F 17/30339 707/714 |
| 2016/0055220 A1* | 2/2016 | Joshi | G06F 3/04842 707/722 |
| 2016/0103879 A1* | 4/2016 | Attaluri | G06F 16/24544 707/714 |
| 2016/0103880 A1* | 4/2016 | Attaluri | G06F 17/30466 707/714 |
| 2016/0267135 A1* | 9/2016 | Idicula | G06F 16/24544 |
| 2016/0328273 A1* | 11/2016 | Molka | G06F 9/505 |
| 2017/0249360 A1* | 8/2017 | Alpers | G06F 16/24544 |

OTHER PUBLICATIONS

Donovan A. Schneider, David J. Dewitt, A Performance Evaluation of Four Parallel Join Algorithms in a Shared-Nothing Multiprocessor Environment, May 17, 1989, pp. 110-121.*

Lefty Leverenz, Skewed Join Optimization, Feb. 23, 2015.*

Fariha Atta, Implementation and Analysis of Join Algorithms to handle skew for the Hadoop Map/Reduce Framework, 2010, MSc Informatics School of Informatics University of Edinburgh, All pages. (Year: 2010).*

Kotoulas et al., Robust Runtime Optimization and Skew-Resistant Execution of Analytical SPARQL Queries on Pig, 2012, ISWC 2012, Part I, LNCS 7649, pp. 247-262, 2012. (Year: 2012).*

Kwon et al., Skew-Resistant Parallel Processing of Feature-Extracting Scientific User-Defined Functions, SoCC'10, Jun. 10-11, 2010, all pages. (Year: 2010).*

PCT International Search Report, PCT Application No. PCT/US2016/058881, dated Jan. 31, 2017, 3 pages.

Kwon et al., "Managing Skew in Hadoop", IEEE, Bulletin of the IEEE Computer Society Technical Committee on Data Engineering, 2013, United States, 10 pages.

* cited by examiner

OPTIMIZING SKEWED JOINS IN BIG DATA

TECHNICAL FIELD

This disclosure relates generally to optimizing joins. Specifically, this disclosure relates to optimizing skewed joins in Big Data systems.

BACKGROUND

Big Data is a term used to describe the exponential growth and availability of data, both structured and unstructured. Big Data may be a term for collection of data sets so large and complex that processing is difficult using traditional data processing applications. Big Data may also mean that the amount or size of data is larger than the memory capacity or storage capacity of a single machine and, hence, multiple machines (e.g., servers or computers) are used to process the data or solve the problem.

BRIEF DESCRIPTION OF THE DRAWINGS

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
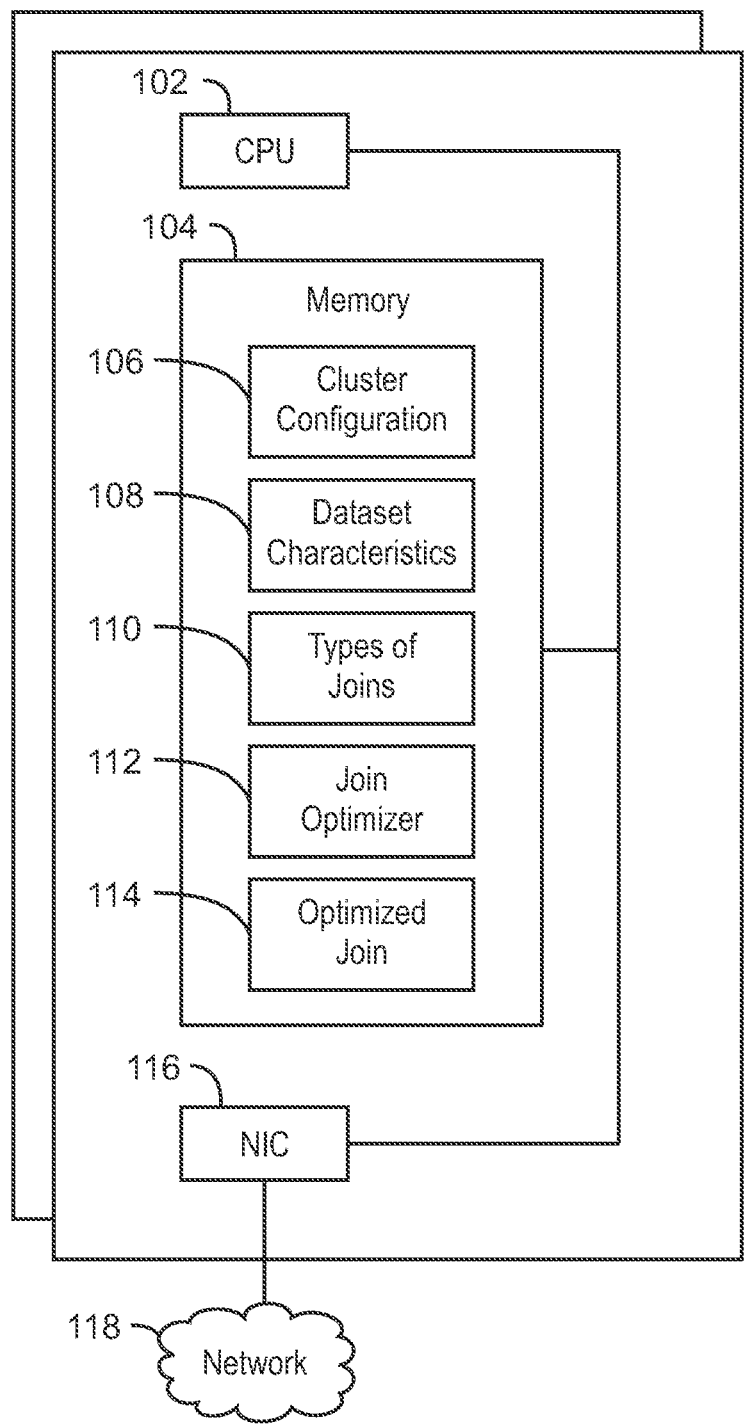
FIG. 1A is a block diagram of a system for optimizing skewed joins in Big Data.

Big data frameworks process vast amounts of data. One of the ways that this data is processed is through the use of join operations performed by a database application. Joins are standard operations in big-data frameworks that combine records from two or more datasets. This is accomplished using a key. For example, two joined datasets may be an EMPLOYEE database table and a DEPARTMENT database table. Each employee may have a record in the EMPLOYEE table, and have a key stored in the DEPARTMENT table to which the EMPLOYEE belongs. In this way, the tables may be joined, where a scan is performed on the tables to identify where the key from the EMPLOYEE table matches a key in the DEPARTMENT table. However, the distribution of keys in such datasets may be highly skewed.

Skew occurs when a small number of keys dominate the population of the join relationship. Examples of data skew are seen in social networks, where celebrities have significantly more followers than most people in the general population. An additional example occurs in network flow data, where gateway devices process significantly more network packets than edge devices. Skew in these scenarios may have implications in the arena of Big Data. When skew occurs in Big Data, the parallel join operations become computationally inefficient due to stragglers. Stragglers are operations that run significantly slower than other operations, and degrade overall performance. However, providing computationally efficient performance of joins in skewed data is challenging. With skewed data, the performance of the join can be significantly degraded by spills to disk. A spill to disk means that some of the data being processed by the join is written to disk because there is not enough room in memory. Spills to disk incur significant input-output (IO) costs, and are a detriment to the performance of the join. Further, in some scenarios, joins can actually fail if a set of skewed keys is too large to fit in memory.

There are several approaches to mitigating the performance impact of skewed data on joins. A partitioning strategy may be employed where skewed keys are divided into multiple partitions before processing the join. Another example of a partitioning strategy is range-partitioning where ranges of keys are uniformly distributed across the cluster. Partitioning skewed keys makes it possible to fit smaller partitions of a skewed key on multiple nodes of a computing cluster, which improves performance by increasing parallelism and reducing spills to disk. A computing cluster is a collection of computer nodes that work in concert to accomplish a job, such as performing a join on Big Data. The job is broken down into a number of tasks which are distributed across nodes in the cluster. Multiple task executors may run on each computer node to perform a portion of the job. In this way, it may be possible to fit skewed keys into memory, which is a useful way to process the keys of a join. Additionally, a specific join technique may be used, such as a broadcast join, where a broadcast variable is utilized to distribute skewed keys across a computing cluster. This join technique may be employed if one of the joined datasets is small enough to fit into memory on one node. The broadcast join replicates the smaller dataset across the nodes of a computing cluster during the join. Each approach has a different impact on space and time overheads. For example, partitioning incurs the overhead of an additional computing process to identify and move the skewed keys before the join is performed. Further, the broadcast join incurs the overhead of the network communications needed to replicate the smaller dataset across the computing cluster. The actual overhead can vary based on the number of operations employed, and based on the numerous ways of replicating skewed data. Another complication that arises with these approaches is identifying the partitions that evenly balance the workload across the computing cluster. Typical approaches use trial-and-error to select the join technique, and the data partitioning strategy. It is noted that the broadcast join is merely one of numerous join techniques for processing skewed data. A join technique is the type of algorithm implemented in a query plan that performs the actual join. Some other example algorithms for implementing joins include hash joins, nested loop joins, sort-merge joins, and the like.

In another approach, an optimizer automatically selects between a broadcast join and a hash join based on whether one of the joined datasets can fit entirely in memory. An optimizer is an executable database component that takes a join query as input, and generates a query plan. The query plan is an executable that performs the actual join. However, this automatically selecting between a broadcast and hash join does not account for skewed keys. Thus, datasets with skewed data experience large processing delays, and sometimes fail due to timeouts associated with writing skewed data to disk. In another approach, a skewed join is used where data is automatically partitioned so that all the data fits in memory at the various nodes of the computing cluster processing the join. The skewed join is an algorithm specifically configured for performing on skewed data. However, in this approach, users have to manually specify the skewed join. Further, the partitioning is one-size-fits-all, and does not consider the impact that varied partitioning strategies may have on performance. In another approach, the big data framework dynamically detects tasks that are processing lots of data. These tasks are stopped, and their unprocessed input data is repartitioned among idle nodes. However, the granularity of re-partitioning for operations like joins in this approach is limited to key-groups so skewed keys are not split across nodes. This approach also does not evaluate different strategies for performing an operation to pick the strategy with the lowest cost.

In embodiments of the present techniques, queuing theory and heuristics are used to model different join techniques, and partitioning techniques, in Big Data applications. Further, a join technique and partitioning technique are automatically selected that minimizes latency, or maximizes throughput, in comparison to the other strategies and techniques. Latency is a measure of how quickly a task is performed. Throughput is a measure of how much work is performed, e.g., how many records of a dataset are processed, in a set period of time.

In the following description, numerous specific details are set forth, such as examples of specific types of processors and system configurations, specific hardware structures, specific architectural and micro architectural details, specific register configurations, specific instruction types, specific system components, specific measurements or heights, specific processor pipeline stages and operation, etc., in order to provide a thorough understanding of the present invention. It will be apparent, however, to one skilled in the art that these specific details need not be employed to practice the present invention. In other instances, well known components or methods, such as specific and alternative processor architectures, specific logic circuits or code for described algorithms, specific firmware code, specific interconnect operation, specific logic configurations, specific manufacturing techniques and materials, specific compiler implementations, specific expression of algorithms in code, specific power down and gating techniques or logic and other specific operational details of computer system have not been described in detail in order to avoid unnecessarily obscuring the present invention.

FIG. 1A is a block diagram of a computing cluster for optimizing skewed joins in Big Data. The computing cluster includes a number of nodes 100 for performing a task. Each node 100 includes a central processing unit (CPU) 102 that is configured to execute stored instructions, as well as a memory 104 that stores instructions that are executable by the CPU 102. The CPU 102 may be coupled to the memory device 104 by a bus 120. Additionally, the CPU 102 can be a single core processor, a multi-core processor, a computing cluster, or any number of other configurations. Furthermore, the computing device 100 may include more than one CPU 102. The memory 104 can include random access memory (RAM), read only memory (ROM), flash memory, or any other suitable memory systems. For example, the memory 104 may include dynamic random access memory (DRAM).

The memory 104 may include a cluster configuration 106, dataset characteristics 108, join techniques 110, a join optimizer 112, and an optimized join 114. The join optimizer may be a database component that generates the optimized join 114 based on the cluster configuration, dataset characteristics, and the available join techniques 110. The optimized join 114 is a query plan that executes the actual join on the computing cluster.

The node 100 may also include a network interface controller (NIC) 116. The NIC 116 may be configured to connect the computing device 100 through the bus 106 to a network 118. The network 118 may be a wide area network (WAN), local area network (LAN), or the Internet, among others. In some examples, the device may communicate with other devices through a wireless technology. For example, the device may communicate with other devices via a wireless local area network connection.

Figure 1B:
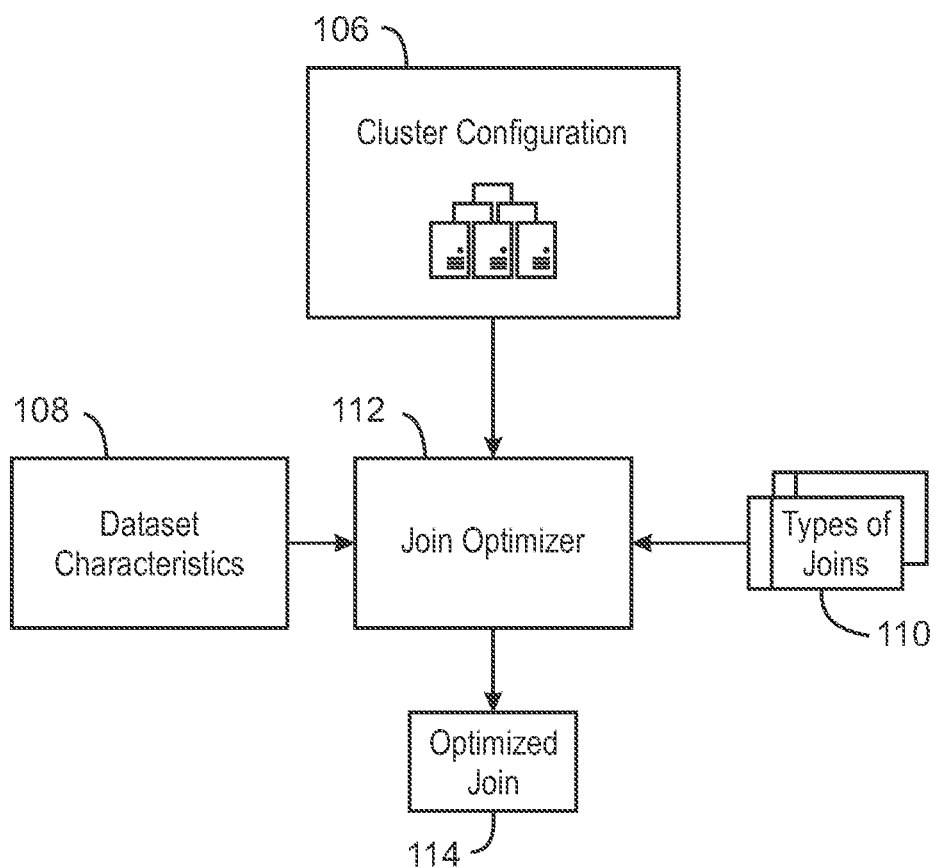
FIG. 1B is a block diagram of a system for optimizing skewed joins in Big Data.

FIG. 1B is a block diagram of a system 100 for optimizing skewed joins in Big Data. In the system 100, the join optimizer 112 uses information about dataset characteristics 108, a cluster configuration 106, and available join techniques 110 to estimate the cost of processing a specific join for each of the join techniques 110, and generate the optimized join 114. The cluster configuration 106 represents information about a computing cluster that is used to process the join in parallel. The computing cluster provides a distributed execution environment where a job, such as a skewed join on Big Data, may be processed in parallel on each node of the cluster. Information about the cluster configuration 106 includes, but is not limited to, the number of task executors, the amount of memory per executor, the number of CPU cores per executor, and network throughput. The executors represent the individual tasks run on each node of the computing cluster. The dataset characteristics 108 include the size of the dataset, the number of records in the dataset, the average record size, and information about key distribution. The available join techniques 110 may include the various algorithms available to implement joins, such as the broadcast join, hash join, sort-merge join, skewed join, and the like. In the system 100, the join optimizer 112 analyzes the cluster configuration 106, and dataset characteristics 108 to determine whether the dataset contains skewed keys that will not fit in the memory of a single task executor. If the dataset contains such skewed keys, the join optimizer 112 estimates the cost of the different available join techniques 110, and partitioning strategies. The join optimizer 112 then selects the join technique and partitioning strategy with the lowest cost. The cost may be represented in terms of latency or throughput.

In one embodiment, the join optimizer 112 models each join technique 110 as a network of queues. The join optimizer evaluates different "what-if" scenarios using the queuing networks to determine the most efficient join technique, and partitioning strategy. The queues model different aspects of the join, such as, the arrival of tasks into the system, the amount of time taken to execute each task, and the number of task executors available to service tasks in parallel. Queues can also model complex behavior such as barrier synchronization where all tasks from one stage of the join must be completed before the next stage begins. These queues can be deterministic queues with uniform task arrival rates, or stochastic queues where the arrival and departure rates have some randomness associated with them. By modeling all the likely behaviors of the join during execution, it is possible to predict the cost of the join according to different join techniques and partitioning strategies. Typically, joins in Big Data frameworks are implemented as a sequence of stages, where the goal is to collocate identical keys from the input datasets into the same partition. For example, if the key value was a simple alphanumeric character, such as, "A," "B," "C," etc., all the records with the key value of "A" would be in the same partition; all the "B's" would be in the same partition, etc. Having all the identical keys on the same partition simplifies the processing of the join because this reduces the amount of coordination needed between the nodes of the computing cluster. The sequence of stages for performing joins in Big Data frameworks is based on the join technique 110.

Figure 2:
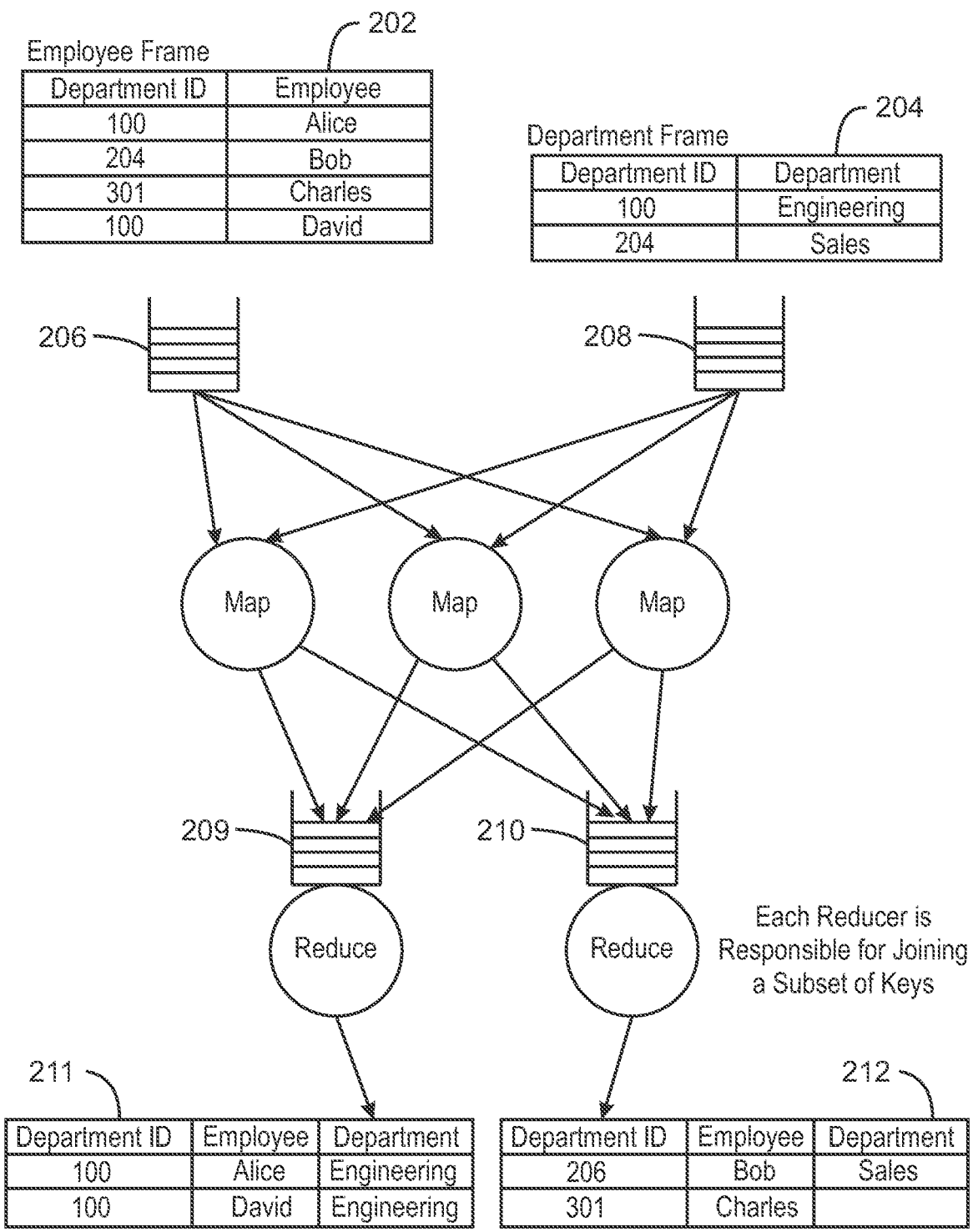
FIG. 2 is a diagram of an example modeling of a skewed left outer join as a network of queues.

FIG. 2 is a diagram of an example of how the query optimizer estimates the cost of different query plans for implementing a skewed left outer join by modeling each plan using a network of queues. The set of query plans is formed by examining different join techniques, partitioning strategies plans, resource usage, and so on. The optimizer then chooses the plan with the smallest cost to execute the join. SQL 1 is an example of a left-outer join:
SELECT *
FROM EMPLOYEE LEFT JOIN DEPARTMENT
ON EMPLOYEE.Department_ID=DEPARTMENT.Department_ID
SQL 1

With respect to joins, the labels, left and right, refer to the datasets' position in the SQL command In SQL 1, the EMPLOYEE dataset is the left table; the DEPARTMENT dataset is the right table. A left-outer join such as this creates a result that combines the records of both the EMPLOYEE AND DEPARTMENT datasets, where the Department_ID's in both datasets match. Additionally, in the left-outer join, records in the left dataset that do not have a match in the right dataset are preserved in the result. Thus, the left-outer join preserves all the records in the left dataset, and only the matching records in the right dataset. Typically, the unmatched records are appended with a NULL record that is the same size as the right dataset.

In FIG. 2, the join is shown being performed in series of stages, with each stage being modeled as a multi-server queue. Modeling in this way captures the inherent parallelism in Big Data frameworks. The number of servers in each queue may vary from a single process to the maximum number of concurrent processes available in the system to execute the join.

The service time of each entry in the queue is estimated based on the size of the input, the cluster configuration, and the cost of the individual operations in the join. Each entry in the queue can either be a single record in stream processing frameworks, or a batch of records in batch processing frameworks. Examples of individual operations in the join are map operations that emit join predicates (keys) and corresponding records from each dataset, shuffle operations that transmit the results from the map operations based on the join key to the reducers, and reduce operations which aggregate, sort, and join records based on the join key. The cost of the individual operations can be estimated by running a small subset of data. Running a small subset of data means performing the individual operation on a limited number of records in the input datasets. Alternatively, the cost of the individual operations can be estimated by using relative measures such as the number of I/O operations, the amount of memory used, and the number of messages transmitted over the network. The estimated service time of each entry in the queue also depends on the probability of spilling to disk if the input block does not fit into memory. Additionally, networking delays that occur between the stages of the join can be modeled using task inter-arrival times. Task inter-arrival times are the amounts of time that elapse between tasks being submitted the queues. Further, the distribution of keys may be determined using a subset of the data. If the distribution of keys is estimated off a sample, it is determined based off the skew of the distribution of keys in the sample whether one or more keys would be likely to fit in memory or not. If not, a determination may be made to use a skewed join based on an expected value of the cost or based off a heuristic. For example, if the probability that one or more keys will not fit in memory is greater than a threshold percentage, e.g., 75%, a skewed join may be used.

Employee dataset 202 and Department dataset 204 are example datasets shown as inputs to the modeled join of FIG. 2. In the first stage of the join, partitions derived from the input datasets 202, 204 are placed in queues 206, 208. Queues reflect an ordering by which records will be processed during the join. If the inputs to the join are batches of records, this is simply an ordering over the original records. When the inputs are a stream of records, the queue is the flow of records, and records are processed in the order of their arrival. The partitions are derived by identifying skewed keys, and splitting the input datasets so that records are evenly distributed across multiple partitions. If a dataset contains a key with so many records that they do not fit into the memory of a single task executor, the records containing the key are partitioned across multiple nodes of the computing cluster. The first stage of the join is the map stage which emits join keys, and corresponding records from the input datasets. Each join key is assigned to a partition using a partitioning function. The partitioning function attempts to distribute data across the cluster as evenly as possible. The first stage is modeled as a multi-server queue where the number of servers in the queue corresponds to the number of task executors available. Each task executor is a process, and there can be multiple processes running on each node in the cluster. The completion time for each stage depends on the service time for each task, the queuing delays due to tasks already in the queue when a new task arrives, and the average time for one of the multiple task executors in the queuing stage to become available. The partitioned data is shuffled 209, 210 and placed in queues prior to the second (reduce) stage of the join. In the second stage of the join, the partitioned data is joined by the matching Department_ID. Each reduce task is responsible for joining a subset of keys. Result 211, 212 shows the result of a left outer join performed on datasets 202, 204. Result 211, 212 can be stored in a distributed file system.

Once the join is modeled as queues, the join optimizer 112 estimates the throughput or latency at the queues 206, 208, 209, 210. Throughput and latency are determined by a number of factors such as the distribution of arrival times of tasks, the distribution of service times for different operations, the hardware specifications, and the number of parallel processes available to execute tasks. The join optimizer 112, as discussed with respect to FIG. 1, also determines the impact that modifying the data partitioning strategy has on throughput and latency. For example, the join optimizer 112 may compare the cost of increasing the number of partitions so that every partition fits in memory against the cost of reducing the number of partitions so that there is less traffic on the network. The join optimizer 112 determines the number of records that can fit into memory based on the average size of each record, the number of records in each partition, and the memory available to each task executor. Re-partitioning the datasets so that all partitions fit into memory may not represent a cost savings due to the extra overhead of determining a new set of partitions, and the increase in queuing delays when the number of data partitions exceeds the number of available task executors. In one embodiment, the join optimizer 112 may only model joins as queues, as described herein, if the input datasets are in excess of a specified threshold size.

Figure 3:
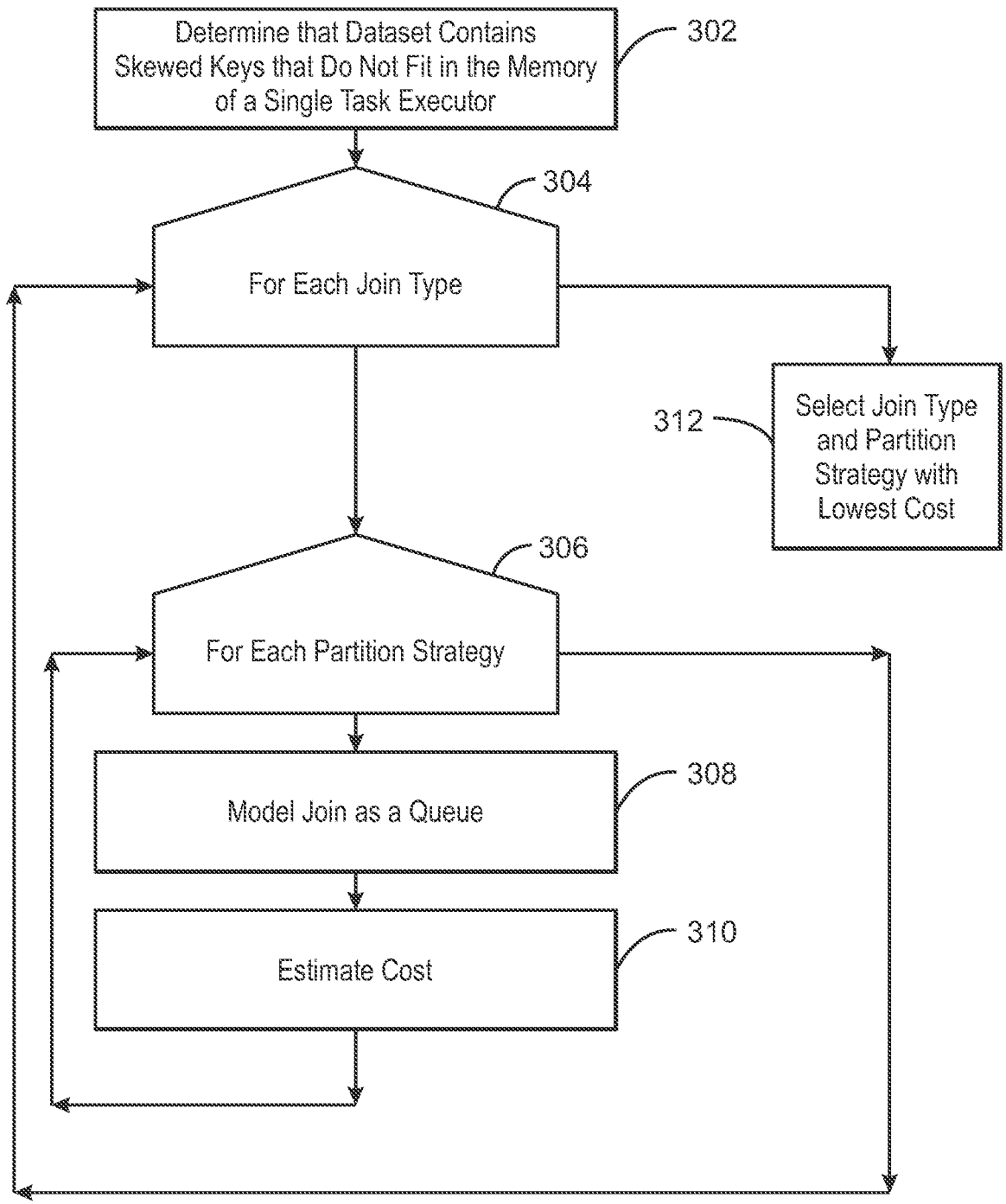
FIG. 3 is a process flow diagram of a method for optimizing skewed joins in Big Data.

FIG. 3 is a process flow diagram of a method 300 for optimizing skewed joins in Big Data. The process flow diagram is not intended to represent a sequence of performing the method 300. The method 300 begins at block 302, where the join optimizer 112 determines that an input dataset contains skewed keys that do not fit in the memory of a single task executor. If there are skewed keys that do not fit in the memory of a single task executor, performance of the join will be slowed. Thus, the method 300 continues to determine the lowest cost partitioning strategy and join technique. Blocks 304-310 are thus performed for each join technique. Further, blocks 306-310 are performed for each partition strategy. At block 308, the join optimizer models the join as a queue. A first queue is built in the first stage for the partitioning strategy based on the join key. A second queue is also built, in a second stage for the join. At block 310, the cost of performing the join is estimated based on the latency or throughput of the queues. Once all the partitioning strategies and join techniques are considered, at block 312, the combination of partitioning strategy and join technique that produces the lowest cost is selected for the join.

Figure 4:
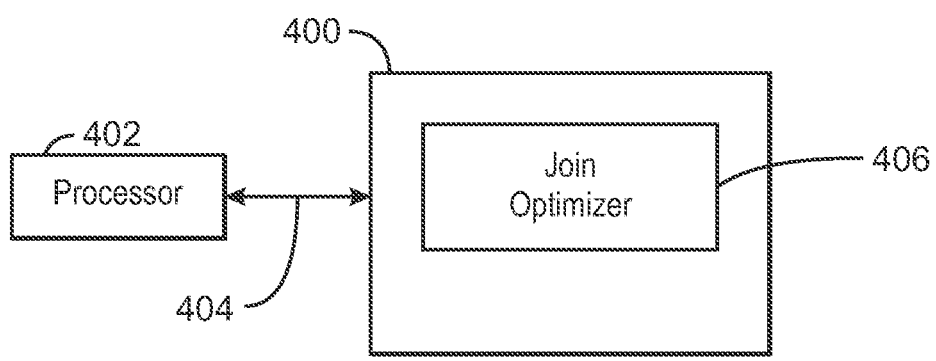
FIG. 4 is a block diagram showing computer readable media that stores code for optimizing skewed joins in Big Data.

FIG. 4 is a block diagram showing computer readable media 400 that store code for optimizing skewed joins in Big Data. The computer readable media 400 may be accessed by a processor 402 over a computer bus 404. Furthermore, the computer readable medium 400 may include code configured to direct the processor 402 to perform the methods described herein. In some embodiments, the computer readable media 400 may be non-transitory computer readable media. In some examples, the computer readable media 400 may be storage media. However, in any case, the computer readable media do not include transitory media such as carrier waves, signals, and the like.

The block diagram of FIG. 4 is not intended to indicate that the computer readable media 400 is to include all of the components shown in FIG. 4. Further, the computer readable media 400 may include any number of additional components not shown in FIG. 4, depending on the details of the specific implementation.

The various software components discussed herein can be stored on one or more computer readable media 400, as indicated in FIG. 4. For example, a join optimizer 406 can be configured to perform the present techniques described herein. The join optimizer 406 determines that a dataset for the skewed join comprises a skewed key that does not fit in memory. Further, the join optimizer 406 models the skewed join as a queue. Additionally, the join optimizer 406 estimates a cost of the skewed join based on the modeled queue.

The block diagram of FIG. 4 is not intended to indicate that the computer readable media 400 is to include all of the components shown in FIG. 4. Further, the computer readable media 400 can include any number of additional components not shown in FIG. 4, depending on the details of the specific implementation.

EXAMPLES

Example 1 is an apparatus for optimizing a skewed join. The apparatus includes logic, at least partially including hardware logic, to determine that a dataset for the skewed join comprises a skewed key that does not fit in memory; model different execution plans for the skewed join as a queue; estimate the cost of each skewed join plan based on the modeled queue; and choose the plan with the lowest cost to execute the skewed join.

Example 2 includes the apparatus of example 1, including or excluding optional features. In this example, the skewed join is modeled based on a type of join algorithm used to perform the skewed join.

Example 3 includes the apparatus of any one of examples 1 to 2, including or excluding optional features. In this example, the skewed join is modeled based on a partitioning strategy.

Example 4 includes the apparatus of any one of examples 1 to 3, including or excluding optional features. In this example, the skewed join is modeled as a queue by generating a first queue for partitioning the dataset based on the join key. Optionally, the partitioning strategy comprises fitting each partition of the dataset into memory, and wherein the partitioning strategy is associated with relatively more network traffic than a partitioning strategy with fewer partitions. Optionally, the skewed join is modeled as a queue by generating a second queue for performing the skewed join. Optionally, the cost is estimated by determining a service time for processing the first queue. Optionally, the cost is estimated by determining a service time for processing the second queue.

Example 5 includes the apparatus of any one of examples 1 to 4, including or excluding optional features. In this example, the cost is estimated based on a latency of the modeled queue.

Example 6 includes the apparatus of any one of examples 1 to 5, including or excluding optional features. In this example, the cost is estimated based on a throughput of the modeled queue.

Example 7 is a method for optimizing a skewed join, the method. The method includes determining that a dataset for the skewed join comprises a skewed key that does not fit in memory; modeling different execution plans for the skewed join as a queue; estimating the cost of each skewed join plan based on the modeled queue; and choosing the plan with the lowest cost to execute the skewed join.

Example 8 includes the method of example 7, including or excluding optional features. In this example, the skewed join is modeled based on a type of join algorithm used to perform the skewed join.

Example 9 includes the method of any one of examples 7 to 8, including or excluding optional features. In this example, the skewed join is modeled based on a partitioning strategy.

Example 10 includes the method of any one of examples 7 to 9, including or excluding optional features. In this example, the skewed join is modeled as a queue by generating a first queue for partitioning the dataset based on the join key. Optionally, the partitioning strategy comprises fitting each partition of the dataset into memory, and wherein the partitioning strategy is associated with relatively more network traffic than a partitioning strategy with fewer partitions. Optionally, the skewed join is modeled as a queue by generating a second queue for performing the skewed join. Optionally, the cost is estimated by determining a service time for processing the first queue. Optionally, the cost is estimated by determining a service time for processing the second queue.

Example 11 includes the method of any one of examples 7 to 10, including or excluding optional features. In this example, the cost is estimated based on a latency of the modeled queue.

Example 12 includes the method of any one of examples 7 to 11, including or excluding optional features. In this example, the cost is estimated based on a throughput of the modeled queue.

Example 13 is at least one computer readable medium for optimizing a skewed join. The computer-readable medium includes instructions that direct the processor to determine that a dataset for the skewed join comprises a skewed key that does not fit in memory; model different execution plans for the skewed join as a queue; estimate the cost of each skewed join plan based on the modeled queue; and choose the plan with the lowest cost to execute the skewed join.

Example 14 includes the computer-readable medium of example 13, including or excluding optional features. In this example, the skewed join is modeled based on a type of join algorithm used to perform the skewed join.

Example 15 includes the computer-readable medium of any one of examples 13 to 14, including or excluding optional features. In this example, the skewed join is modeled based on a partitioning strategy.

Example 16 includes the computer-readable medium of any one of examples 13 to 15, including or excluding optional features. In this example, the skewed join is modeled as a queue by generating a first queue for partitioning the dataset based on the join key. Optionally, the partitioning strategy comprises fitting each partition of the dataset into memory, and wherein the partitioning strategy is associated with relatively more network traffic than a partitioning strategy with fewer partitions. Optionally, the skewed join is modeled as a queue by generating a second queue for performing the skewed join. Optionally, the cost is estimated by determining a service time for processing the first queue. Optionally, the cost is estimated by determining a service time for processing the second queue.

Example 17 includes the computer-readable medium of any one of examples 13 to 16, including or excluding optional features. In this example, the cost is estimated based on a latency of the modeled queue.

Example 18 includes the computer-readable medium of any one of examples 13 to 17, including or excluding optional features. In this example, the cost is estimated based on a throughput of the modeled queue.

Example 19 is a system for optimizing a skewed join. The system includes instructions that direct the processor to means to determine that a dataset for the skewed join comprises a skewed key that does not fit in memory; means to model different execution plans for the skewed join as a queue; means to estimate the cost of each skewed join plan based on the modeled queue; and means to choose the plan with the lowest cost to execute the skewed join.

Example 20 includes the system of example 19, including or excluding optional features. In this example, the skewed join is modeled based on a type of join algorithm used to perform the skewed join.

Example 21 includes the system of any one of examples 19 to 20, including or excluding optional features. In this example, the skewed join is modeled based on a partitioning strategy.

Example 22 includes the system of any one of examples 19 to 21, including or excluding optional features. In this example, the skewed join is modeled as a queue by generating a first queue for partitioning the dataset based on the join key. Optionally, the partitioning strategy comprises fitting each partition of the dataset into memory, and wherein the partitioning strategy is associated with relatively more network traffic than a partitioning strategy with fewer partitions. Optionally, the skewed join is modeled as a queue by generating a second queue for performing the skewed join. Optionally, the cost is estimated by determining a service time for processing the first queue. Optionally, the cost is estimated by determining a service time for processing the second queue.

Example 23 includes the system of any one of examples 19 to 22, including or excluding optional features. In this example, the cost is estimated based on a latency of the modeled queue.

Example 24 includes the system of any one of examples 19 to 23, including or excluding optional features. In this example, the cost is estimated based on a throughput of the modeled queue.

Example 25 is a system for optimizing a skewed join. The system includes instructions that direct the processor to a processor; and a memory comprising instructions that cause the processor to: determine that a dataset for the skewed join comprises a skewed key that does not fit in memory; model different execution plans for the skewed join as a queue; estimate the cost of each skewed join plan based on the modeled queue; and choose the plan with the lowest cost to execute the skewed join.

Example 26 includes the system of example 25, including or excluding optional features. In this example, the skewed join is modeled based on a type of join algorithm used to perform the skewed join.

Example 27 includes the system of any one of examples 25 to 26, including or excluding optional features. In this example, the skewed join is modeled based on a partitioning strategy.

Example 28 includes the system of any one of examples 25 to 27, including or excluding optional features. In this example, the skewed join is modeled as a queue by generating a first queue for partitioning the dataset based on the join key. Optionally, the partitioning strategy comprises fitting each partition of the dataset into memory, and wherein the partitioning strategy is associated with relatively more network traffic than a partitioning strategy with fewer partitions. Optionally, the skewed join is modeled as a queue by generating a second queue for performing the skewed join. Optionally, the cost is estimated by determining a service time for processing the first queue. Optionally, the cost is estimated by determining a service time for processing the second queue.

Example 29 includes the system of any one of examples 25 to 28, including or excluding optional features. In this example, the cost is estimated based on a latency of the modeled queue.

Example 30 includes the system of any one of examples 25 to 29, including or excluding optional features. In this example, the cost is estimated based on a throughput of the modeled queue.

Not all components, features, structures, characteristics, etc., described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for optimizing a skewed join, comprising a processor to:
   determine that a dataset for the skewed join comprises a skewed key that does not fit in memory allocated to a single task executor;
   model each of a plurality of different execution plans for the skewed join as a network of queues in response to determining that the skewed key does not fit in the memory and that the dataset exceeds a threshold size, wherein the skewed join is modeled as a queue by generating a first queue for partitioning the dataset based on a join key and a second queue for performing the skewed join;
   estimate a cost comprising a service time for each execution plan based on the modeled network of queues; and
   select the execution plan with a lowest cost to execute the skewed join.

2. The apparatus of claim 1, wherein the skewed join is modeled based on a type of join algorithm used to perform the skewed join.

3. The apparatus of claim 1, wherein the skewed join is modeled based on a partitioning strategy.

4. The apparatus of claim 3, wherein the partitioning strategy comprises fitting each partition of the dataset into memory, and wherein the partitioning strategy is associated with relatively more network traffic than a partitioning strategy with fewer partitions.

5. The apparatus of claim 1, wherein the cost is estimated by determining the service time for processing the first queue.

6. The apparatus of claim 5, wherein the cost is estimated by determining the service time for processing the second queue.

7. The apparatus of claim 1, wherein the cost is estimated based on a latency of the modeled network of queues.

8. The apparatus of claim 1, wherein the cost is estimated based on a throughput of the modeled network of queues.

9. A method for optimizing a skewed join, the method comprising:
   determining that a dataset for the skewed join comprises a skewed key that does not fit in memory allocated to a single task executor;
   modeling each of a plurality of different execution plans for the skewed join as a network of queues in response to determining that the skewed key does not fit in the memory and that the dataset exceeds a threshold size, wherein the skewed join is modeled as a queue by generating a first queue for partitioning the dataset based on a join key and a second queue for performing the skewed join;
   estimating a cost comprising a service time for each execution plan based on the modeled network of queues; and
   selecting the execution plan with a lowest cost to execute the skewed join.

10. The method of claim 9, wherein the skewed join is modeled based on a type of join algorithm used to perform the skewed join.

11. The method of claim 9, wherein the skewed join is modeled based on a partitioning strategy.

12. The method of claim 11, wherein the dataset is partitioned by fitting each partition of the dataset into memory.

13. The method of claim 9, wherein the cost is estimated by determining the service time for processing the first queue.

14. The method of claim 13, wherein the cost is estimated by determining the service time for processing the second queue.

15. At least one computer readable medium for optimizing a skewed join, the medium having instructions stored therein that, in response to being executed on a processor, cause the processor to:
   determine that a dataset for the skewed join comprises a skewed key that does not fit in memory allocated to a single task executor;
   model each of a plurality of different execution plans for the skewed join as a network of queues in response to determining that the skewed key does not fit in the memory and that the dataset exceeds a threshold size, wherein the skewed join is modeled as a queue by generating a first queue for partitioning the dataset based on a join key and a second queue for performing the skewed join;
   estimate a cost comprising a service time for each execution plan based on the modeled network of queues; and
   select the execution plan with a lowest cost to execute the skewed join.

16. The computer readable medium of claim 15, wherein the skewed join is modeled based on a type of join algorithm used to perform the skewed join.

17. The computer readable medium of claim 15, wherein the skewed join is modeled based on a partitioning strategy.

18. The apparatus of claim 1, wherein a service time of each entry in the modeled network of queues is estimated based on a size of each entry, a cluster configuration, and a cost of individual operations in the skewed join.

* * * * *